US012683685B2

(12) United States Patent
Lin et al.

(10) Patent No.: US 12,683,685 B2
(45) Date of Patent: Jul. 14, 2026

(54) METHOD AND SYSTEM FOR IMPLEMENTING MULTI- SERVICE BEARER IN PASSIVE OPTICAL LAN

(71) Applicant: Guangzhou Chonge Information Technology Co., LTD, Guangzhou (CN)

(72) Inventors: Junfa Lin, Guangzhou (CN); Hui Liu, Guangzhou (CN); Yongjun Zhao, Guangzhou (CN); Chengxuan Tan, Guangzhou (CN); Xubin Li, Guangzhou (CN)

(73) Assignee: Guangzhou Chonge Information Technology Co., LTD, Guangzhou (CN)

( * ) Notice: Subject to any disclaimer, the term of this patent is extended or adjusted under 35 U.S.C. 154(b) by 218 days.

(21) Appl. No.: 18/542,632

(22) Filed: Dec. 16, 2023

(65) Prior Publication Data

US 2024/0121000 A1 Apr. 11, 2024

(30) Foreign Application Priority Data

Sep. 11, 2023 (CN) ......................... 202311160163.1

(51) Int. Cl.
*H04B 10/25* (2013.01)
*H04Q 11/00* (2006.01)
(52) U.S. Cl.
CPC ......... *H04B 10/25* (2013.01); *H04Q 11/0067* (2013.01); *H04Q 2011/0086* (2013.01)

(58) Field of Classification Search
CPC ............... H04B 10/25; H04Q 11/0067; H04Q 2011/0086
See application file for complete search history.

(56) References Cited

U.S. PATENT DOCUMENTS

| | | | | |
|---|---|---|---|---|
| 5,805,597 A | * | 9/1998 | Edem | H04L 12/44 |
| | | | | 370/445 |
| 9,131,289 B2 | * | 9/2015 | Cvijetic | H04Q 11/0066 |
| 10,306,344 B2 | * | 5/2019 | Mehrvar | H04Q 11/0005 |
| 11,115,736 B2 | * | 9/2021 | Ruffini | H04Q 11/0067 |
| 11,575,431 B2 | * | 2/2023 | Shiner | H04J 14/0271 |
| 11,750,291 B2 | * | 9/2023 | Ra | H04L 41/0893 |
| | | | | 398/58 |
| 2003/0235309 A1 | | 12/2003 | Struik et al. | |

(Continued)

*Primary Examiner* — Dalzid E Singh
(74) *Attorney, Agent, or Firm* — Hemisphere Law, PLLC

(57) ABSTRACT

The present disclosure relates to the technical field of campus local area networks (LANs), and particularly discloses a method and system for implementing multi-service bearer in a passive optical LAN (POL). The method includes: step S1: constructing a POL, and accessing an entire campus network at a bandwidth of Gigabit according to a point-to-multipoint star topology including three layers: a core layer, a convergence layer, and an access layer, to form a 10 Gbit backbone, wherein an optical network terminal enters a room and is deployed according to such a manner that one classroom or functional room has one terminal mode; step S2: planning and managing the entire POL, defining a plurality of LANs through software definition (SD-LAN), wherein different LANs bear different services; and step S3: allocating different service bandwidths to different LANs through a sharding mechanism of the PON, and the like.

8 Claims, 2 Drawing Sheets

Construct a POL, and access an entire campus network at a bandwidth of Gigabit according to a point-to-multipoint star topology including three layers: a core layer, a convergence layer, and an access layer, to form a 10Gbit backbone, wherein an optical network terminal enters a room and is deployed according to such a manner that one classroom or functional room has one terminal mode ——— S1

Plan and manage the entire POL, and define a plurality of LANs through a software definition (SD)-LAN, wherein different LANs bear different services ——— S2

Allocate different service bandwidths to different LANs through a sharding mechanism of the PON ——— S3

(56) References Cited

U.S. PATENT DOCUMENTS

| | | |
|---|---|---|
| 2009/0296939 A1 | 12/2009 | Struik et al. |
| 2013/0045012 A1* | 2/2013 | Kanonakis ......... H04Q 11/0067 |
| | | 398/66 |
| 2014/0173276 A1 | 6/2014 | Vanstone et al. |
| 2017/0214984 A1* | 7/2017 | Roe .................... H04Q 11/0067 |
| 2021/0352385 A1* | 11/2021 | Thollabandi ........ H04J 14/0238 |
| 2023/0126161 A1* | 4/2023 | Zhao .................... H04L 45/028 |
| | | 370/410 |

* cited by examiner

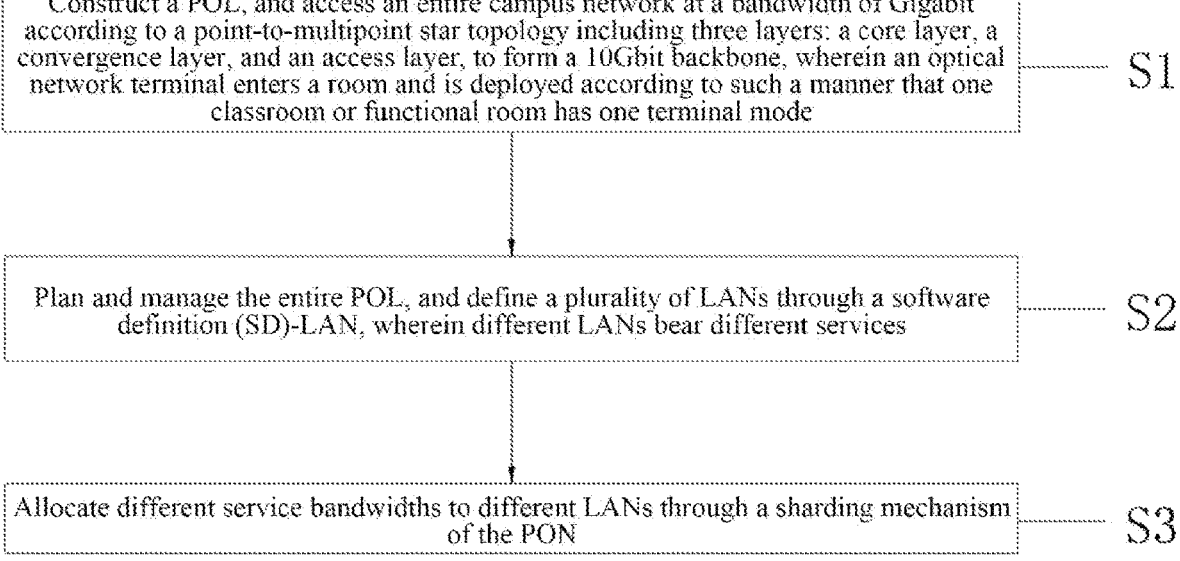

Construct a POL, and access an entire campus network at a bandwidth of Gigabit according to a point-to-multipoint star topology including three layers: a core layer, a convergence layer, and an access layer, to form a 10Gbit backbone, wherein an optical network terminal enters a room and is deployed according to such a manner that one classroom or functional room has one terminal mode ............ S1

Plan and manage the entire POL, and define a plurality of LANs through a software definition (SD)-LAN, wherein different LANs bear different services ............ S2

Allocate different service bandwidths to different LANs through a sharding mechanism of the PON ............ S3

FIG. 1

METHOD AND SYSTEM FOR IMPLEMENTING MULTI- SERVICE BEARER IN PASSIVE OPTICAL LAN

TECHNICAL FIELD

The present disclosure relates to the technical field of campus local area networks (LANs), and particularly, to a method and system for implementing a multi-service bearer in a passive optical LAN.

BACKGROUND

With the rapid development of informatization construction of campus networks, a significant increase in data applications is caused. Meanwhile, the integration and innovation of various services are also spawning new changes in LAN construction. However, in a new service mode of a traditional LAN, in order to ensure an operating bandwidth of each service, it is often necessary to separately deploy independent networks.

With the rapid advancement of smart campus construction and "Education Informatization 2.0", it is particularly important to study how to apply the advantages of an "optical base" of a passive optical LAN. For the above problem, the Passive Optical LAN (POL) can well adapt to new services and can easily and effectively complete transformation of a campus network. Combining POL networking with a plurality of services to construct a unified campus bearer network provides more options and possibilities for campus LAN construction.

In summary, a method and system for implementing multi-service bearer in a passive optical LAN are provided.

SUMMARY

The present disclosure aims to provide a method and system for implementing multi-service bearer in a passive optical LAN, so as to solve the problem below: In a new service mode of a traditional LAN, in order to ensure an operating bandwidth of each service, it is often necessary to separately deploy independent networks, which is inconvenient for overall management.

In order to achieve the above objective, the present disclosure provides the following technical solution: a method for implementing multi-service bearer in a POL. The method includes:

step S1: constructing a POL, and accessing an entire campus network at a bandwidth of Gigabit according to a point-to-multipoint star topology including three layers: a core layer, a convergence layer, and an access layer, to form a 10 Gbit backbone, wherein an optical network terminal enters a room and is deployed according to such a manner that one classroom or functional room has one terminal mode;

step S2: planning and managing the entire POL, and defining a plurality of LANs through a software definition (SD)-LAN, wherein different LANs bear different services; and step S3: allocating different service bandwidths to different LANs through a sharding mechanism of the PON, wherein the SD-LAN is a software definition LAN.

As a preferable implementation solution of the present disclosure, in step S1, a campus network core and an access device are in an active design; the convergence layer is in a passive optical network design; the core layer uses an optical line terminal (OLT); the access layer uses an optical network unit (ONU); and the convergence layer uses a passive optical distribution network (ODN) device for networking.

As a preferable implementation solution of the present disclosure, in the method, the SD-LAN provides peer-to-peer LAN communication by constructing a peer-to-peer communication pipeline and controlling the communication pipeline to communicate with different service systems.

As a preferable implementation solution of the present disclosure, in the method, devices that the SD-LAN can manage include a Broadband Remote Access Server (BRAS), an OLT, an ONU, and the SD-LAN cooperates with a core switch and a service system.

As a preferable implementation solution of the present disclosure, in step S2, a LAN partitioning method of the SD-LAN includes:

partitioning according to devices: an OLT, an OLT board card, a PON port, and an ONU port;

partitioning according to physical positions: different buildings, floors, teaching areas, and office areas;

partitioning according to services: video monitoring, an all-purpose card, a water and electricity meter, an Internet of Things terminal, an office network, a teaching network, and a student network; and partitioning according to multi-access control (MAC) addresses of device terminals: allocation of the devices to the different LANs.

As a preferable implementation solution of the present disclosure, in the SD-LAN control in step S3, the LANs can be divided according to an actual situation of a school, corresponding bandwidths are allocated to the different LANs.

A system for implementing multi-service bearer in a POL is provided. The system includes:

a dynamic SD-LAN partitioning module: configured to dynamically partition a POL into different LANs, wherein each LAN bears different services;

an SD-LAN bandwidth management module: wherein the SD-LAN bandwidth management module is configured to configure quality of service (QoS) of an SD-LAN to the peer-to-peer bandwidth channel allocated to each LAN to ensure that respective service systems have an enough bandwidth;

an SD-LAN monitoring module: configured to monitor a running condition of the entire POL, usages of the bandwidths of the different LANs, a usage of a bandwidth of each terminal in each LAN, usages of bandwidths of nodes contained in each LAN, and whether a bandwidth bottleneck exists; and an SD-LAN calculation module, wherein the SD-LAN calculation module is configured to calculate a bandwidth born by each PON port and calculate an available maximum bandwidth, and can indicate, when a new service is configured at the PON port, a remaining bandwidth for allocation of the PON and whether the PON port is able to bear the newly added service.

As a preferable implementation solution of the present disclosure, the system further includes an SD-LAN recording module, and the SD-LAN recording module is configured to record a running condition of each node in the POL.

As a preferable implementation solution of the present disclosure, the bandwidth management module of the system is based on bandwidth control of a gigabit-capable passive optical network (GPON); an uplink data stream in the GPON is transmitted in a time division multiple address (TDMA) manner; the GPON bears an uplink service through a T-CONT, and the OLT achieves uplink in a scheduling manner by a database administrator (DBA), wherein the T-CONT is the most basic control unit for an uplink band-width in the GPON system; and the uplink bandwidth of each service can be controlled by configuring a corresponding T-CONT for each service.

As a preferable implementation solution of the present disclosure, the T-CONT is divided into five types: only providing a fixed bandwidth, only providing an assured bandwidth, providing assured and non-assured bandwidths, providing a best-effort bandwidth, and simultaneously providing a fixed bandwidth, an assured bandwidth, and a non-assured bandwidth.

Compared with the prior art, the present disclosure has the beneficial effects below:

The present disclosure can achieve the construction of the POL. A high-reliability, high-performance, high-bandwidth, low-latency, fast, and convenient authentication system of the POL greatly improves the surfing experience of users. Students can be connected to the campus network anytime and anywhere to quickly access teaching resources. Convenient interactive learning on online platforms and convenient network access and management for multiple services such as water and electricity control, multi-purpose card, Internet phone, monitoring, and entrance guard lay a good foundation for promoting the development of a smart campus and transformation of online education, which effectively promotes the development of the smart informatization construction level of a campus.

BRIEF DESCRIPTION OF THE DRAWINGS

To describe the technical solutions in a system of the present disclosure more clearly, the following briefly describes the accompanying drawings required for describing the embodiments or the prior art. Apparently, the accompanying drawings in the following description show merely some embodiments of the present disclosure.

FIG. 1 is a flowchart of steps of a method for implementing multi-service bearer in a POL according to the present disclosure.

DETAILED DESCRIPTION OF THE EMBODIMENTS

Figure 2:
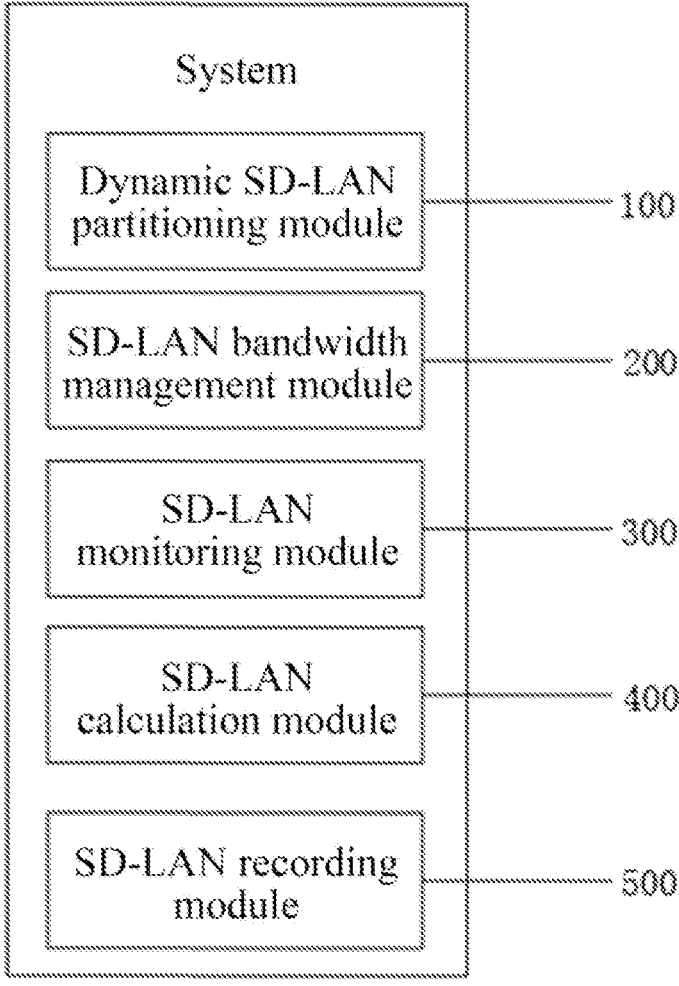
FIG. 2 is a structural diagram of a system for implementing multi-service bearer in a POL according to the present disclosure.

In order to make the technical problems, technical solutions, and beneficial effects to be solved by the present disclosure clearer, the following is a further detailed explanation of the present disclosure in conjunction with the accompanying drawings and embodiments. It should be understood that the specific embodiments described here are only intended to explain the present disclosure and are not intended to limit the present disclosure.

Referring to FIG. 1 to FIG. 2, the present disclosure provides a detailed explanation of the technical solutions proposed in order to achieve the purpose of the background section.

The present disclosure provides a method for implementing multi-service bearer in a POL. The method includes:

step S1: a POL is constructed, and an entire campus network is accessed at a bandwidth of Gigabit according to a point-to-multipoint star topology including three layers: a core layer, a convergence layer, and an access layer, to form a 10 Gbit backbone, wherein an optical network terminal enters a room and is deployed according to such a manner that one classroom or functional room has one terminal mode;

step S2: the entire POL is planned and managed, and a plurality of LANs are defined through an SD-LAN, wherein different LANs bear different services; and step S3: different service bandwidths are allocated to different LANs through a sharding mechanism of the PON, wherein the SD-LAN is a software definition LAN.

Further, in step S1, a campus network core and an access device are i an active design; the convergence layer is in a passive optical network design; the core layer uses an OLT; the access layer uses an ONU; and the convergence layer uses a passive ODN device for networking.

Further, in the method, the SD-LAN provides peer-to-peer LAN communication by constructing a peer-to-peer communication pipeline and controlling the communication pipeline to communicate with different service systems.

Further, in the method, devices that the SD-LAN can manage include a BRAS, an OLT, an ONU, and the SD-LAN cooperates with a core switch and a service system.

Further, in step S2, a LAN partitioning method of the SD-LAN includes:

partitioning according to devices: an OLT, an OLT board card, a PON port, and an ONU port;

partitioning according to physical positions: different buildings, floors, teaching areas, and office areas;

partitioning according to services: video monitoring, an all-purpose card, a water and electricity meter, an Internet of Things terminal, an office network, a teaching network, and a student network; and partitioning according to multi-access control (MAC) addresses of device terminals: allocation of the devices to the different LANs.

Further, in the SD-LAN control in step S3, the LANs can be divided according to an actual situation of a school, corresponding bandwidths are allocated to the different LANs.

In this embodiment, the entire campus network is accessed at the bandwidth of Gigabit according to the three-layer point-to-multipoint star topology to form the 10 Gbit backbone. The optical network terminal enters the room and is deployed according to such a manner that one classroom or functional room has one terminal mode; the respective service systems of a school are uniformly managed in a data center machine room. The technical solution is advanced and satisfies application to a smart campus.

The construction is performed according to the core-convergence-access three-layer structure. A core and an access device are in an active design; the convergence layer is in a passive optical network design; the core layer uses an OLT; the access layer uses an ONU; and the convergence layer uses a passive ODN device for networking.

Further, in the method, the SD-LAN of the POL is different from an SDN networking manner of a switch. The SD-LAN does not distinguish the LANs through partitioning of a VLAN, but the SD-LAN provides peer-to-peer LAN communication by constructing a peer-to-peer communication pipeline and controlling the communication pipeline to communicate with different service systems. Devices that the SD-LAN can manage include a BRAS, an OLT, an ONU, and the like, and cooperate with a core switch and the service systems to achieve that one POL bears multiple services of the smart campus.

A LAN partitioning method of the SD-LAN is more flexible and can includes: partitioning according to devices: an OLT, an OLT board card, a PON port, and an ONU port;

partitioning according to physical positions: different buildings, floors, teaching areas, and office areas; partitioning according to services: video monitoring, an all-purpose card, a water and electricity meter, an Internet of Things terminal, an office network, a teaching network, and a student network; and partitioning according to MAC addresses of device terminals: allocation of the devices to the different LANs. According to the present disclosure, the LANs can be divided according to an actual situation of a school, corresponding bandwidths are allocated to the different LANs.

A system for implementing multi-service bearer in a POL is provided. The system includes:

a dynamic SD-LAN partitioning module 100: configured to dynamically partition a POL into different LANs, wherein each LAN bears different services;

an SD-LAN bandwidth management module 200: wherein the SD-LAN bandwidth management module is configured to configure quality of service (QoS) of an SD-LAN to the peer-to-peer bandwidth channel allocated to each LAN to ensure that respective service systems have an enough bandwidth;

an SD-LAN monitoring module 300: configured to monitor a running condition of the entire POL, usages of the bandwidths of the different LANs, a usage of a bandwidth of each terminal in each LAN, usages of bandwidths of nodes contained in each LAN, and whether a bandwidth bottleneck exists; and an SD-LAN calculation module 400, wherein the SD-LAN calculation module is configured to calculate a bandwidth born by each PON port and calculate an available maximum bandwidth, and can indicate, when a new service is configured at the PON port, a remaining bandwidth for allocation of the PON and whether the PON port is able to bear the newly added service.

The system further includes an SD-LAN recording module 500, and the SD-LAN recording module is configured to record a running condition of each node in the POL.

This system can achieve the peer-to-peer communication pipeline through the POL network. One end of the peer-to-peer pipeline is the various service systems, and the other end can be an OLT, a board card of the OLT, a PON port of the OLT, an ONU, a port of the ONU, and a terminal connected to the ONU. Due the scheduling of a controller of the SD-LAN, these peer-to-peer pipelines are formed into different LANs, and different bandwidths are configured for these pipelines according to service requirements. The bandwidth management module of the system is based on bandwidth control of a GPON; an uplink data stream in the GPON is transmitted in a time division multiple address (TDMA) manner; the GPON bears an uplink service through a T-CONT, and the OLT achieves uplink in a scheduling manner by a database administrator (DBA), wherein the T-CONT is the most basic control unit for an uplink bandwidth in the GPON system; and the uplink bandwidth of each service can be controlled by configuring a corresponding T-CONT for each service. The T-CONT is divided into five types: only providing a fixed bandwidth, only providing an assured bandwidth, providing assured and non-assured bandwidths, providing a best-effort bandwidth, and simultaneously providing a fixed bandwidth, an assured bandwidth, and a non-assured bandwidth, wherein TYPE 1 only provides the fixed bandwidth and allocates a fixed time slot. This type of bandwidth control is suitable for delay-sensitive services, such as a voice service.

TYPE 2 only provides the assured bandwidth and does not allocate a fixed time slot. If the provided assured bandwidth is not used up, the remaining bandwidth will be automatically released. This type of bandwidth control is suitable for services that do not have high requirements for bandwidth jitter, but have a certain requirement for the bandwidth, such as a video camera.

TYPE 3 provides the assured and non-assured bandwidths. If the provided assured bandwidth is not used up, the remaining bandwidth will be automatically released. If a required bandwidth exceeds the assured bandwidth, only the assured bandwidth is ensured to be provided, and another bandwidth needs to compete for the position. This type of bandwidth control can ensure a minimum bandwidth assurance and also share a dynamic bandwidth, and has a maximum bandwidth limit. It is suitable for services with a service assurance demand and sudden traffic, such as email sending.

TYPE 4 provides the best-effort bandwidth, which makes the best effort, but does not have an assured bandwidth. It is applicable to ordinary Internet applications.

TYPE 5 simultaneously provides the fixed bandwidth, the assured bandwidth, and the non-assured bandwidth. However, bandwidths are allocated according to the priorities of the four bandwidth types.

The above five bandwidth management types correspond to different T-CONTs. Different T-CONTs can be configured on the same ONU according to different services. Each T-CONT is configured with different bandwidth management types according to different service requirements. By configuring different bandwidth management types for different services and utilizing bandwidth resources of each PON reasonably and fully, one POL can bear multiple services, and each service can be allocated with appropriate bandwidth resources.

The bandwidth management of the SD-LAN can achieve dynamic bandwidth management of the POL. For example, in some scenarios where services need to be provided temporarily and special requirements are put forward to a bandwidth, a new LAN can be temporarily configured, and a bandwidth policy satisfying the requirements can be configured to quickly start services. After a temporary task is completed, the corresponding LAN can be quickly deleted to release relevant bandwidth resources, which ensures a temporary service need, without causing a waste of bandwidths to the POL.

In summary, after the present disclosure completes the planning of the LANs, administrators of the different LANs can view the respective LAN topologies and the MAC addresses, IP addresses, and other information, as well as traffic conditions, of the terminals through the present disclosure. The administrator of each LAN can only see the topology information of the LAN the administrator manages, which simplifies content that needs to be observed by the network administrator when the network administrator monitors the LAN managed by the network administrator.

The present disclosure can also monitor a running condition of the entire POL, usages of the bandwidths of the different LANs, a usage of a bandwidth of each terminal in each LAN, usages of bandwidths of nodes contained in each LAN, and whether a bandwidth bottleneck exists; and record a running condition of each node in the POL, for example, a port state of the ONU, usage of an overall traffic of the ONU, usage of an overall traffic of the PON port, usage of an overall uplink traffic of the OLT, and whether a bandwidth bottleneck exists.

Through the present disclosure, the POL can be dynamically partitioned into the different LANs, and each LAN bears different services. The QoS of the SD-LAN is configured to the peer-to-peer bandwidth channel allocated to each LAN to ensure that the respective service systems have an enough bandwidth.

The present disclosure can calculate a bandwidth born by each PON port and calculate an available maximum bandwidth, and can indicate, when a new service is configured at the PON port, a remaining bandwidth for allocation of the PON and whether the PON port is able to bear the newly added service. If the PON port is unable to bear a new service, some nodes of the POL can be considered to be used for expansion.

A processor extracts and analyzes instructions one by one from a memory, and then completes corresponding operations according to requirements of the instructions to generate a series of control commands that make various parts of a computer automatically, continuously, and coordinately do actions, forming an organic whole. This realizes inputting of programs, inputting and calculation of data, and outputting of results. Arithmetic or logical operations generated in this process are all completed by an arithmetic unit. The memory includes a Read-Only Memory (ROM). The ROM is configured to store a computer program, and is externally provided with a protection device.

Exemplarily, the computer program can be partitioned into one or more modules, and the one or more modules are stored in the memory and executed by the processor to complete the present disclosure. The one or more modules can be a series of computer program instruction segments capable of completing specific functions. The instruction segments are configured to describe an execution process of the computer program in a terminal device.

A person skilled in the art can understand that the above description of the service devices is only an example and does not constitute a limitation on terminal devices. It can include more or fewer components than those described above, or combinations of some components, or different components, such as an input and output device, a network access device, and a bus.

The processor may be a central processing unit (CPU), or may be other general-purpose processors, digital signal processors (DSPs), application-specific integrated circuits (ASICs), field-programmable gate arrays (FPGAs), or may be other programmable logic devices, discrete gates or transistor logic devices, and discrete hardware components. The general-purpose processor can be a microprocessor, any conventional processor, or the like. The processor described above is a control center of the terminal device described above, and connects various parts of the entire user terminal through various interfaces and circuits.

The memory described above can be configured to store computer programs and/or modules, and the processor described above achieves various functions of the terminal device described above by running or executing the computer programs and/or modules stored in the memory, as well as calling the data stored in the memory. The memory can mainly include a program storage area and a data storage area, wherein the program storage area can store an operating system, an application program required by at least one function (such as an information acquisition template presentation function and a product information posting function), and the like. The data storage area can store data established according to use of a berth state display system (such as product information acquisition templates corresponding to different product types and product information that needs to be posted by different product providers) and the like. In addition, the memory can include a high-speed random access memory, and can further include a nonvolatile memory, such as a hard disk drive, an internal memory, a plug-in hard disk drive, a smart media card (SMC), a secure digital (SD) card, a flash card, at least one disk storage device, a flash device, or other volatile solid-state storage devices.

When the modules/units integrated in the terminal device are implemented in the form of a software functional unit and sold or used as an independent product, the modules/units may be stored in a computer-readable storage medium. Based on this understanding, the present disclosure implements all or part of the modules/units in the system of the above embodiment, and can also be completed by instructing relevant hardware through the computer program. The computer program described above can be stored in the computer-readable storage medium. When executed by the processor, the computer program can achieve the functions of the various system embodiments described above. The computer program includes computer program codes, and the computer program codes can be in the form of a source code, the form of an object code, an executable file, or some intermediate forms. The computer-readable media can include any entity or device capable of carrying the computer program codes, a recording medium, a USB flash disk, a mobile hard disk drive, a magnetic disk, an optical disk, a computer memory, a ROM, a RAM, an electrical carrier signal, a telecommunications signal, a software distribution medium, and the like.

It should be noted that the terms "include", "comprise", or any other variations thereof herein are intended to cover a non-exclusive inclusion, so that a processor, method, object, or apparatus including a series of elements not only includes those elements, but also includes other elements not specifically listed, or includes inherent elements of this process, method, object, or apparatus. Without more limitations, elements defined by the sentence "including one" does not exclude that there are still other same elements in the process, method, object, or apparatus including these elements.

The above descriptions are merely the preferred embodiments of the present disclosure and are not intended to limit the protection scope of the present disclosure. Any modification, equivalent replacement, and improvement made within the principle and implementation scope of the present disclosure shall fall within the protection scope of the present disclosure.

It should be noted that the terms "include", "comprise", or any other variations thereof herein are intended to cover a non-exclusive inclusion, so that a processor, method, object, or apparatus including a series of elements not only includes those elements, but also includes other elements not specifically listed, or includes inherent elements of this process, method, object, or apparatus. Without more limitations, elements defined by the sentence "including one" does not exclude that there are still other same elements in the process, method, object, or apparatus including these elements.

The above describes only preferred embodiments of the present disclosure and does not limit the patent scope of the present disclosure. Any equivalent structure or equivalent process transformation made using the specification and accompanying drawings of the present disclosure, or directly or indirectly applied in other related technical fields, are equally included in the scope of patent protection of the present disclosure.

What is claimed is:

1. A method for implementing multi-service bearer in a passive optical LAN (POL), wherein the method comprises:

step S1: constructing a POL, and accessing an entire campus network at a bandwidth of Gigabit according to a point-to-multipoint star topology comprising three layers: a core layer, a convergence layer, and an access layer, to form a 10 Gbit backbone, wherein an optical network terminal enters a room and is deployed according to such a manner that one classroom or functional room has one terminal mode;

step S2: planning and managing the entire POL, and defining a plurality of LANs through a software definition (SD)-LAN, wherein different LANs bear different services; and step S3: allocating different service bandwidths to different LANs through a sharding mechanism of the PON, wherein the SD-LAN is a software definition LAN;

wherein in step S1, a campus network core and an access device are in an active design; the convergence layer is in a passive optical network design; the core layer uses an optical line terminal (OLT); the access layer uses an optical network unit (ONU); and the convergence layer uses a passive optical distribution network (ODN) device for networking;

wherein in the method, the SD-LAN provides peer-to-peer LAN communication by constructing a peer-to-peer communication pipeline and controlling the communication pipeline to communicate with different service systems.

2. The method for implementing the multi-service bearer in the POL according to claim 1, wherein in the method, devices that the SD-LAN manages comprise a Broadband Remote Access Server (BRAS), an OLT, an ONU, and the SD-LAN cooperates with a core switch and a service system.

3. The method for implementing the multi-service bearer in the POL according to claim 2, wherein in step S2, a LAN partitioning method of the SD-LAN comprises:

partitioning according to devices: an OLT, an OLT board card, a PON port, and an ONU port;

partitioning according to physical positions: different buildings, floors, teaching areas, and office areas;

partitioning according to services: video monitoring, an all-purpose card, a water and electricity meter, an Internet of Things terminal, an office network, a teaching network, and a student network; and partitioning according to multi-access control (MAC) addresses of device terminals: allocation of the devices to the different LANs.

4. The method for implementing the multi-service bearer in the POL according to claim 3, wherein in the SD-LAN control in step S3, the LANs are divided according to an actual situation of a school, corresponding bandwidths are allocated to the different LANs.

5. A system for implementing multi-service bearer in a POL, wherein the system is configured to perform the method claim 1, and the system comprises:

a dynamic SD-LAN partitioning module: configured to dynamically partition the POL into different LANs, wherein each LAN bears different services;

an SD-LAN bandwidth management module: wherein the SD-LAN bandwidth management module is configured to configure quality of service (QoS) of the SD-LAN to the peer-to-peer bandwidth channel allocated to each LAN to ensure that respective service systems have an enough bandwidth;

an SD-LAN monitoring module: configured to monitor a running condition of the entire POL, usages of the bandwidths of the different LANs, a usage of a bandwidth of each terminal in each LAN, usages of bandwidths of nodes contained in each LAN, and whether a bandwidth bottleneck exists; and an SD-LAN calculation module, wherein the SD-LAN calculation module is configured to calculate a bandwidth born by each PON port, calculate an available maximum bandwidth, and indicate, when a new service is configured at the PON port, a remaining bandwidth for allocation of the PON and whether the PON port is able to bear the newly added service.

6. The system for implementing the multi-service bearer in the POL according to claim 5, wherein the system further comprises an SD-LAN recording module, and the SD-LAN recording module is configured to record a running condition of each node in the POL.

7. The system for implementing the multi-service bearer in the POL according to claim 6, wherein the bandwidth management module of the system is based on bandwidth control of a gigabit-capable passive optical network (GPON); an uplink data stream in the GPON is transmitted in a time division multiple address (TDMA) manner; the GPON bears an uplink service through a T-CONT, and the OLT achieves uplink in a scheduling manner by a database administrator (DBA), wherein the T-CONT is the most basic control unit for an uplink bandwidth in the GPON system; and the uplink bandwidth of each service is controlled by configuring a corresponding T-CONT for each service.

8. The system for implementing the multi-service bearer in the POL according to claim 7, wherein the T-CONT is divided into five types: only providing a fixed bandwidth, only providing an assured bandwidth, providing assured and non-assured bandwidths, providing a best-effort bandwidth, and simultaneously providing a fixed bandwidth, an assured bandwidth, and a non-assured bandwidth.

* * * * *